June 7, 1949.  F. G. GERBER  2,472,156
PANEL ACCESS-OPENING CLOSURE
Filed Nov. 23, 1946  2 Sheets-Sheet 1
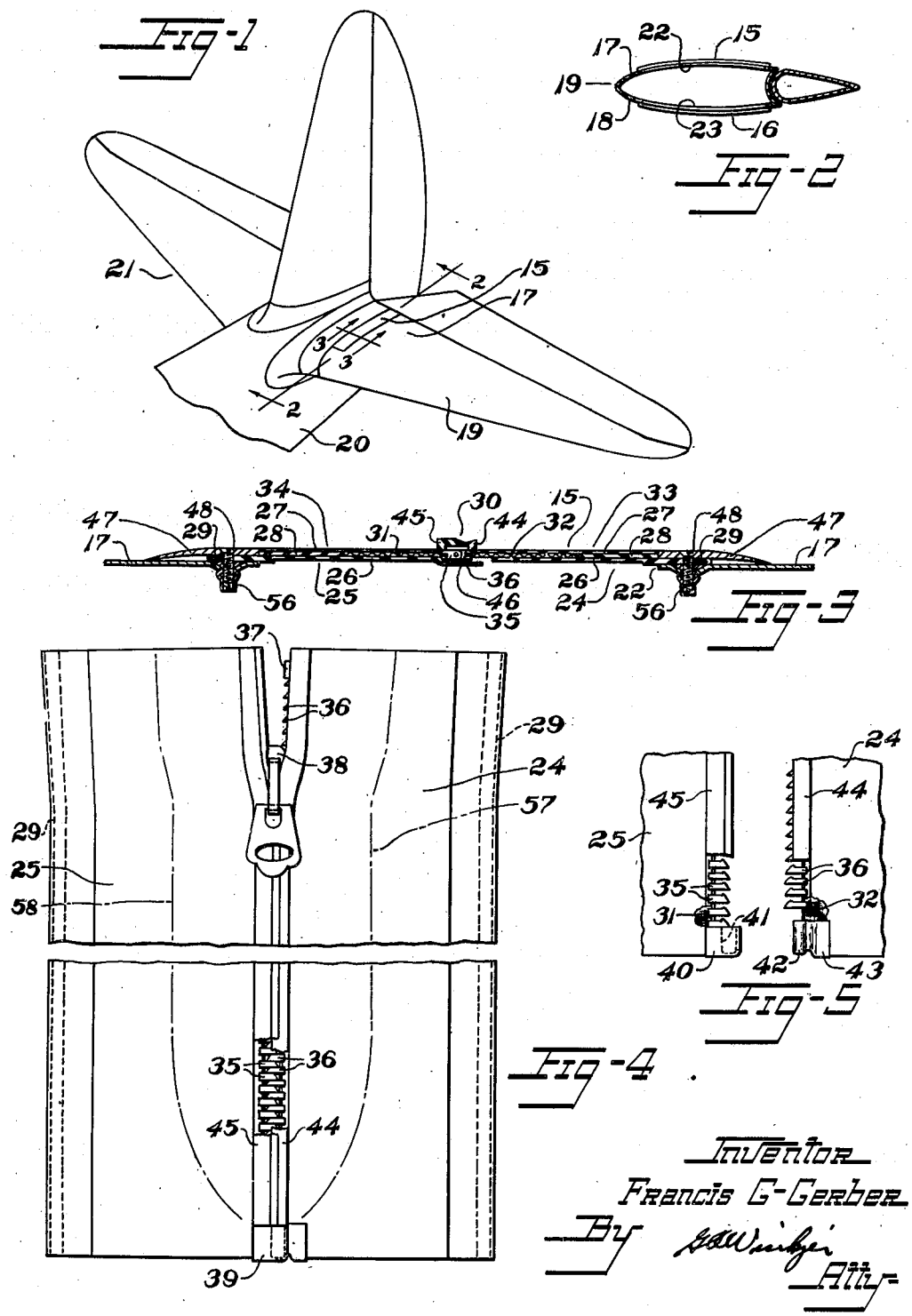
Inventor
Francis G. Gerber
By
Atty.

June 7, 1949.  F. G. GERBER  2,472,156
PANEL ACCESS-OPENING CLOSURE
Filed Nov. 23, 1946  2 Sheets-Sheet 2
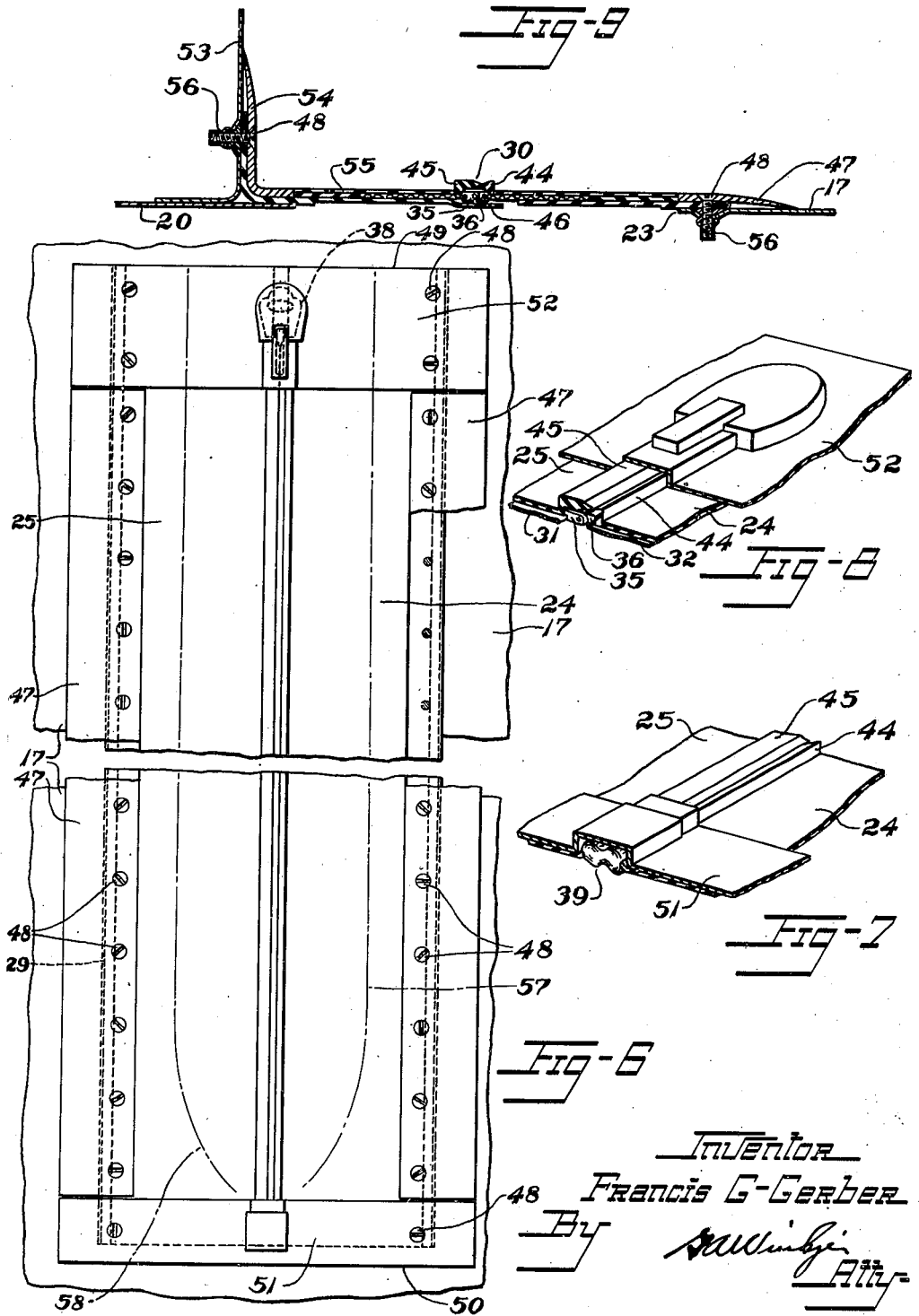
Inventor
Francis G. Gerber Patented June 7, 1949

2,472,156

UNITED STATES PATENT OFFICE 2,472,156

PANEL ACCESS-OPENING CLOSURE

Francis G. Gerber, Akron, Ohio, assignor to The B. F. Goodrich Company, New York, N. Y., a corporation of New York Application November 23, 1946, Serial No. 711,863

12 Claims. (Cl. 244—129)

The invention relates to panel access-opening closures for structures and especially to separable access-opening closures for aircraft.

The assembling and disconnecting of stabilizers, vertical fins, wings and other structural elements of aircraft, which may be of the flying boat or the land plane types, to and from adjoining parts of the aircraft such, for example, as the fuselage as by nut and bolt attachments have heretofore involved the difficulty of inaccessibility of the attachments beneath the skins of the stabilizers and other elements. The inspection of and servicing operations on the connections between such elements and parts of the aircraft have been usually accomplished laboriously and inconveniently as by entirely removing screw-fastened hand hole covers at the access-openings in the outer surfaces.

Cemented-down fabric sheets and sheet metal strips as used heretofore for the walls and contoured outer surfaces of the aircraft not only have tended to create objectionable disturbances of the airflow about the outer surfaces, but generally have lacked air-tightness and water-tightness, especially under variable pressure conditions at such surfaces, and sheet metal cover strips have tended to buckle under distorting stresses. Cemented-down fabric tends to lose its installed tautness resulting in objectionable flapping and bulging with adverse effect upon the flow of air and resulting in an unsightly condition at the access-opening.

Objects of the invention are to provide for overcoming effectively the foregoing and other deficiencies and disadvantages, and to provide improved panel closure means for an access-opening; to provide for quick and full accessibility to attachments or other apparatus and fittings concealed by a wall or other surface of a structure; to provide for fluid-tightness of the closure; to provide for full separability, convenience of removability, and tautness of the closure; to provide for smooth conformance of the closure to the surface of the structure, especially a contoured surface of an aircraft; to provide for yieldingly maintaining the tautness of the closure and for resisting flapping and bulging between margins of the closure; and to provide for simplicity of construction, convenience of manufacture, installation and servicing, and for effectiveness of operation.

More specific objects of the invention are to provide an elastic and separable panel access-opening closure construction; to provide for convenience of access to attachments and other fittings and apparatus beneath the skin of a stabilizer, especially at the region of joinder between the stabilizer and fuselage of the aircraft; to provide for separably joining adjacent parts of the closure in an air-tight and water-tight manner by sealing slide fastener means; to provide for protecting the slide fastener; and to provide for conducting static electricity from the surface of the closure to the aircraft.

These and other objects and advantages of the invention will be apparent from the following description.

In the drawings, which form a part of this specification and in which like numerals are employed throughout to designate like parts, Fig. 1 is a perspective view from above of an aircraft empennage with upper and lower panel access-opening closures mounted on the stabilizer skin, and constructed in accordance with and embodying the invention, parts being broken away, Fig. 2 is a sectional view taken along line 2—2 of Fig. 1 showing the panel closures at the upper and lower skins of the stabilizer, Fig. 3 is a sectional view in an enlarged scale taken along line 3—3 of Fig. 1 showing the upper panel closure, Fig. 4 is a plan view from above showing the closure including panel sections and a sealing slide fastener and before attachment of the closure to the stabilizer, parts being broken away, Fig. 5 is a view of the closure at the closed end of the slide fastener with the panel sections in fully separated relation, parts being broken away, Fig. 6 is a plan view from above of the upper panel closure in assembled relation with the stabilizer, parts being broken away, Fig. 7 is a perspective view from above of the fore or closed end of the panel closure shown in Fig. 6, parts being broken away, Fig. 8 is a view like Fig. 7 but showing the aft or open end of the panel closure, parts being broken away, and Fig. 9 is a sectional view taken transversely of a modified construction of the panel closure, parts being broken away.

The illustrative embodiment of the invention shown in the drawings has separable access-opening closures 15, 16 mounted on the upper and lower outer skins or surfaces 17, 18 of a stabilizer 19 in sealing relation therewith and at the junction of the stabilizer with a fuselage 20 at the region of the aircraft empennage 21. The closures may be mounted overlying the access-openings 22, 23 in the outer skins 17, 18, as shown especially in Figs. 1, 2 and 3. Since the respective closures 15 and 16 are alike in construction, only the closure 15 will be described in detail.

The upper access-opening closure 15 has a pair of laterally spaced-apart panel sections 24, 25 of flexible, impervious material, preferably including resilient rubber or other rubber-like material, extending along the access-opening 22, which access-opening may be of elongated and generally rectangular form for facilitating assembly and inspection operations on the underlying attachments or other fittings over an extensive area of the stabilizer adjacent the fuselage. Each panel section is of sheet construction integral throughout its thickness and having desirably an underlying or inner layer 26 of elastic textile fabric material coated or impregnated with the resilient rubber-like material, a relatively thin outer layer 27 of rubber-like material having particles of electrically-conductive material such, for example, as acetylene black imbedded therein for removal of static electricity charges from the closure, and an intermediate layer 28 comprising resilient rubber-like material. The elastic textile fabric layer 26 may be folded over at its outer margin about a reinforcing bead 29 of relatively stiff, flat steel wire for providing attaching margins facilitating securing the closure in surface-conforming and sealing relation to the stabilizer.

Separable fastener means 30, preferably a slide fastener, is mounted at adjacent or inner margins of the panel sections 24, 25 for closing and opening the access-opening closure. In the arrangement shown in the drawings, flexible, relatively inextensible stringers 31, 32 of square-woven cotton fabric material, for example, are disposed between the inner and outer rubber layers 26, 27, respectively, and adhesively secured thereto as by a suitable rubber cement. The stringers 31, 32 extend longitudinally along the entire extent of the panel sections 24, 25 and extend transversely of the closure part way toward the attaching margins providing stretchable portions 33, 34 of the resilient rubber-like material and elastic fabric intermediate the attaching margins and the stringers, each of which stretchable portions is relatively more stretchable laterally of the closure as compared to the stretchability of the adjoining portions of the panel section for facilitating maintaining the closure taut in the closed condition of the latter.

Cooperating fastener elements or teeth 35, 36 in series along the stringers are secured to the latter at the adjacent edge portions thereof. A suitable stop 37 is provided at the aft or open end of the slide fastener 30 for preventing manipulation of a runner 38 beyond the ends of the teeth. Separable stop means 39 is disposed at the fore or closed end of the slide fastener for facilitating full separation of the panel section 24, 25 throughout the entire longitudinal extent of the latter, when such open condition of the closure is desired. As shown especially in Fig. 5, the separable stop means 39 may include a retainer element 40 having a recess 41 therein for receiving a pin portion 42 of an engaging element 43, which elements 40 and 43 are secured to the fabric stringers 31, 32 adjacent the ends of the respective series of teeth. Manipulation of the runner 38 in the direction toward the separable stop means 39 disengages the teeth 35, 36, and upon disengagement of the element 43 from the retainer element 40, the slide fastener is fully disengaged throughout the entire length of the panel sections.

Sealing elements 44, 45 extend along the slide fastener 30 for sealing the separable panel closure in a fluid-tight and especially a water-tight, manner upon closing the slide fastener; since the stabilizer of a flying boat, for example, may be subjected to water spray during the landing and take-off of the aircraft. The sealing elements are of the resilient rubber-like material, and may be generally L-shaped in cross-section and tapering to thin edges at the free end portions thereof for effecting lip-sealing action against one another continuously along their extent for the closed condition of the slide fastener. Desirably, the sealing elements 44, 45 are mounted directly upon the teeth and are in continuation of the outer rubber layer 27 of the panel sections for assuring continuity of sealing at the mounted end portions of the teeth.

An anti-chafing strip 46 of suitable woven rubberized fabric may be attached to one of the panel sections, desirably the section 25, and arranged to underlie and overlap the teeth of the slide fastener for the closed condition of the latter. This construction protects the slide fastener teeth against accidental damage as by chafing against interior parts of the stabilizer.

The fabric and rubber-like parts of the panel sections 24, 25 are united preferably by vulcanization under heat and pressure. The arrangement provides the desired sheet wall construction having the laterally stretchable portions of relatively high stretchability intermediate the attaching margins and the slide fastener. The flexibility of the resilient panel sections and the highly stretchable portions facilitate the smooth conformance of the panel sections 24, 25 overlying the access-opening 22 to the fore and aft contour of the stabilizer, while maintaining the desired lateral tautness of the closure for preventing objectionable bulging and disturbance of the aerodynamic flow of air across the stabilizer.

The attaching margins at each side of the access-opening are desirably recessed, as shown especially in Fig. 3, to receive suitable fairing strips 47, 47 of formed aluminum alloy or other metal material, so that each fairing strip presses against and is in smooth continuation of the closure and merges smoothly with the skin of the stabilizer for avoiding aerodynamic disturbance of the air-flow thereover. The panel sections 24, 25 at their attaching margins may, if desired for additional sealing purposes, be adhered to the skin of the stabilizer. The panel closure is secured to the stabilizer by a series of spaced-apart screw fasteners 48, 48 extending through the fairing strips 47, 47 inwardly of the beads 29, 29 and engaging suitable interiorly threaded rivets 56, 56 secured to the skin 17 of the stabilizer. The construction is such that the panel closure in the closed condition, as shown especially in Fig. 3, is maintained taut by virtue of the stretching action at the stretchable portions 33, 34, and sealing is provided by the lip-sealing action of the sealing elements 44, 45 and the sealing action along the attaching margins.

Separable means 49, 50 overlying the fore and aft end portions of the panel sections 24, 25 maintain the sealing elements in closed relation at the ends of the slide fastener and in addition hold the panel sections tightly against the stabilizer by a clamping action. The means 50 at the fore end of the panel closure includes a plate element 51 of relatively stiff metal material such, for example, as aluminum alloy sheet metal secured separably to the stabilizer by the screw fastener 48-rivet 56 arrangement described hereinabove. The plate element 51 is formed to receive the retainer element 40 and the engaging element 43 of the stop means 39 and also the end portions of the sealing elements 44, 45, as shown especially in Figs. 6 and 7. If desired, the fore end portions of the panel sections 24, 25 may be adhered to the stabilizer. The plate element 51 assures maintaining the sealing elements in closed relation at the fore end of the slide fastener.

The separable means 49 at the aft end of the panel closure includes a plate element 52 of suitable sheet metal material overlying the end portions of the panel sections 24, 25 and secured separably to the stabilizer by the screw fastener 48-rivet 56 arrangement described hereinabove. In the preferred construction, the panel sections are not adhered to the stabilizer across their aft end portions underlying the plate element 52 for facilitating full opening of the panel closure to its fore end at the plate element 51, as shown by broken lines 57, 58 in Fig. 4. The plate element 52 is formed to embrace and hold the end portions of the sealing elements 44, 45 in closed relation and in addition is formed to receive the runner 38, as shown especially in Figs. 6 and 8. When secured to the stabilizer, the plate element 52 effects a sealing and a clamping action across the aft end portions of the panel sections.

When assembling the stabilizer 19 to the fuselage 20, for example, as by nut and bolt fasteners, convenient access to the attachments is provided over an extensive area of the stabilizer by means of the upper panel closure 15. This is accomplished by removing the separable plate element 52, and then manipulating the runner 38 in the direction toward the fore end of the panel closure to the other plate element 51, thereby disengaging the teeth of the slide fastener and separating the sealing elements throughout the longitudinal extent of the panel closure. The flexible panel sections may then be folded laterally along their length to substantially the position indicated by broken lines 57, 58 in Figs. 4 and 6, thereby providing an opening of substantial longitudinal and lateral extent for manipulation of tools, for example, by the operator.

Upon conclusion of the assembling operation or the completion of servicing and/or inspection operations, the upper panel closure 15 is placed in the closed and preferably water-tight conditions by manipulating the runner 38 toward the aft end of the closure to the stop means 37 thus engaging the teeth 35, 36 and disposing the sealing elements 44, 45 in fluid-tight sealing relation. The plate element 52 is then secured to the stabilizer thereby retaining the runner against accidental movement and holding the end portions of the sealing elements in closed relation. The panel sections 24, 25 are in a laterally taut condition and flexibly conform to the contour of the stabilizer. In this manner, the separable access-opening closure 15 closes and seals effectively the access-opening 22 against leakage of water and air.

The modification of the panel closure shown in Fig. 9 is constructed and arranged substantially like that of the upper panel closure 15 described hereinabove, except that one of the attaching margin and fairing strip arrangements is of angular construction for attachment to a longitudinally-extending shear angle element 53 of the fuselage 20, for example. To this end, the fairing strip 54 of suitable sheet metal material is generally L-shaped in cross-section and the panel section 55 corresponding to the panel section 25 has its attaching margin bent to conform to the angular fairing strip 54 and to seat against the fuselage 20 and the shear angle element 53, as shown especially in Fig. 9. The operation of the modified panel closure for assembly and inspection purposes, for example, is like that described hereinabove for the upper panel closure 15.

In addition to the advantages of providing full opening of the access-opening, smooth conformance to the contour of the stabilizer, and maintaining lateral tautness of the closure in the closed condition thereof, the construction facilitates servicing of the closure itself in case of accidental damage to its respective parts. For example, if it is desired to replace one of the panel sections without removing the other, this may be readily accomplished by removal of the plate elements 51 and 52 and the associated fairing strip 47, and completely disengaging the slide fastener including the separable stop means 39. The panel section then may be removed and a new one installed. Upon re-engagement of the stop means 39 and replacement of the fore end plate element 51, the panel closure may be placed in the closed condition by suitable manipulation of the runner and re-installation of the aft end plate element 52.

Variations may be made without departing from the scope of the invention as it is defined in the following claims.

I claim:

1. A separable access-opening closure for a structure, said closure comprising flexible closure panel means subject to conditions of flexure and having means for securing the same in sealing relation to the structure with said panel means overlying the access-opening, said panel means including separable fastener means for closing and opening the same and said panel means including flexible sealing means united with said panel means at said fastener means for sealing said panel means upon closing said fastener means and for flexing directly and conformingly with said panel means under flexure thereof in the closed and open conditions of the closure.

2. A separable access-opening closure for a structure, said closure comprising flexible closure panel means subject to conditions of flexure and having means for securing the same in sealing relation to the structure with said panel means overlying the access-opening, said panel means including a slide fastener for closing and opening the same and said panel means including sealing elements of flexible material united with said panel means at said slide fastener for sealing the same upon closing of said slide fastener and for flexing directly and conformingly with said panel means under flexure thereof in the closed and open conditions of the closure.

3. A separable access-opening closure for a structure, said closure comprising flexible closure panel means subject to conditions of flexure and having means for securing the margin thereof in sealing relation to the structure at the margin of the access-opening with said panel means overlying the access-opening, said panel means including a slide fastener for closing and opening the same and said panel means including sealing elements of resilient material extending along and united with said panel means at said slide fastener for sealing said panel means upon closing of said slide fastener and for resiliently flexing directly and conformingly with said panel means under flexure thereof in the closed and open conditions of the closure, and separable means for maintaining said sealing elements in closed relation at an end of said slide fastener and for holding said panel means at said end in separable sealing relation to said margin of the access-opening.

4. A separable access-opening closure for a structure, said closure comprising flexible closure panel means having means for securing the margin thereof in sealing relation to the structure at the margin of the access-opening with said panel means overlying the access-opening, said panel means including laterally spaced-apart panel sections of impervious flexible rubber-like material for extending along the access-opening and being subject to conditions of flexure, a slide fastener mounted at said panel sections separably joining the latter for closing and opening said panel means, sealing elements of resilient rubber-like material mounted on said panel sections at said slide fastener for sealing said panel means upon closing of said slide fastener and for resiliently flexing directly and conformingly with said panel sections under flexure thereof, and clamping plate means for maintaining said sealing elements in closed relation at the ends of said slide fastener and holding said panel sections at the ends thereof against said structure.

5. A closure as defined in claim 4 in which a clamping plate means at an end of the closure overlies end portions of said panel sections and an end of said slide fastener and said sealing elements, and is separable therefrom for facilitating fully opening the closure from said end thereof thereby permitting wide separation of said panel sections in a folded manner for access through the closure.

6. A separable panel access-opening closure for an aircraft structure, said closure comprising flexible closure panel means having means for securing the margin thereof in water-tight sealing relation to the aircraft structure at the margin of the access-opening with said panel means overlying the access-opening, said panel means including laterally spaced-apart panel sections of impervious flexible material for extending along the access-opening and being subject to conditions of flexure, one of said panel sections comprising elastically stretchable material for maintaining said panel means taut in the closed condition thereof, separable fastener means mounted at said panel sections separably joining the latter for closing and opening said panel means, and sealing elements of impervious resilient material mounted on said panel sections at said separable fastener means for sealing said panel means against leakage of water upon closing of said separable fastener means and for flexing directly and conformingly with said panel sections under flexure thereof, and means for maintaining said sealing elements in closed relation at the ends of said separable fastener means.

7. A separable panel access-opening closure for an aircraft structure, said closure comprising flexible closure panel means having means for securing the margin thereof in water-tight sealing relation to the aircraft structure at the margin of the access-opening with said panel means overlying the access-opening, said panel means including laterally spaced-apart panel sections of impervious flexible material for extending along the access-opening and being subject to conditions of flexure, at least one of said panel sections comprising resilient rubber-like material and being laterally stretchable for maintaining said panel means taut in the closed condition thereof, a slide fastener mounted at adjacent margins of said panel sections separably joining the latter for closing and opening said panel means, and sealing elements of resilient rubber-like material mounted on said panel sections at said adjacent margins thereof and at said slide fastener for sealing said panel means against leakage of water upon closing of said slide fastener and for resiliently flexing directly and conformingly with said panel sections under flexure thereof, and separable means for maintaining said sealing elements in closed relation at the ends of said slide fastener.

8. A separable panel access-opening closure for an airfoil, said closure comprising a pair of elongated panel sections of flexible impervious material for extending along the access-opening and being subject to flexure in the closed and open conditions of the closure, said panel sections having means for securing the attaching margins thereof in air-tight sealing relation to the airfoil at the margin of the access-opening with said panel sections overlying the access-opening, at least one of said panel sections having a portion of resilient rubber-like material extending along the same and being stretchable laterally of the panel section for maintaining said closure taut in the closed condition thereof, a slide fastener at adjacent margins of said panel sections separably joining the latter from end to end thereof for closing and opening said closure, sealing elements of resilient rubber-like material mounted on said panel sections at said adjacent margins thereof and at said slide fastener for sealing said closure air-tight upon closing of said slide fastener and for resiliently flexing directly and conformingly with said panel sections under flexure thereof in said closed and open conditions of the closure, and separable plate means overlying said panel sections at said ends for maintaining said sealing elements in closed relation at said ends of said panel sections.

9. A separable panel access-opening closure for an airfoil, said closure comprising a pair of elongated panel sections of flexible impervious material for extending along the access-opening and having means for securing the attaching margins thereof in air-tight sealing relation to the airfoil at the margin of the access-opening with said panel sections overlying the access-opening, each panel section having a portion of resilient rubber-like material extending along the same and being stretchable laterally of the panel section for maintaining said closure taut in the closed condition thereof, a slide fastener including a runner at adjacent margins of said panel sections separably joining the latter from end to end thereof for closing and opening said closure, sealing elements of said rubber-like material mounted on said slide fastener for sealing said closure air-tight upon closing of said slide fastener, and separable clamping plate means overlying said panel sections at said ends thereof and the ends of said sealing elements for holding said panel sections against the airfoil and for maintaining said sealing elements in closed relation at said ends of said panel sections, one of said plate means being constructed and arranged to receive said runner and said sealing elements.

10. A separable access-opening closure for an aircraft structure, said closure comprising flexible closure panel means subject to conditions of flexure and having means for securing the margin thereof in sealing relation to the structure at the margin of the access-opening with said panel means overlying the access-opening, said panel means including laterally spaced-apart panel sections of impervious flexible material for extending along the access-opening, each panel section at its outer surface comprising resilient rubber-like material having therein particles of electrically conductive substance for conducting electricity at said outer surface, said panel means including separable fastener means mounted on said panel sections for closing and opening the same, and said panel means including sealing elements of flexible material united with said panel sections at said fastener means for sealing said panel means upon closing said fastener means and for flexing directly and conformingly with said panel sections under flexure thereof in the closed and open conditions of the closure.

11. A separable panel access-opening closure for an aircraft structure, said closure comprising a pair of panel sections of impervious resilient rubber-like sheet material for extending along the access-opening and being subject to conditions of flexure, said panel sections having means for securing the attaching margins thereof in air-tight sealing relation to said structure at the margin of the access-opening with said panel sections overlying the access-opening, each panel section including in said sheet material thereof a reinforcement of elastic textile sheet material and including at the outer surface of the panel section particles of electrically conductive substance in the rubber-like material of said surface for conducting electricity at said outer surface, and each panel section being stretchable laterally thereof for maintaining the closure taut in the closed condition thereof, a slide fastener at adjacent margins of said panel sections separably joining the latter from end to end thereof for closing and opening the closure, and sealing elements of resilient rubber-like material mounted on said panel sections at said adjacent margins and at said slide fastener for sealing said closure air-tight upon closing of said slide fastener and for flexing directly and conformingly with said panel sections under flexure thereof.

12. A closure as defined in claim 11 in which the securing means for the attaching margins includes a laterally tapered fairing strip of angular form in cross-section for positioning along a longitudinally-extending attaching margin of a panel section in continuation thereof and for contacting an element of said aircraft structure.

FRANCIS G. GERBER.

REFERENCES CITED

The following references are of record in the file of this patent:

UNITED STATES PATENTS

| Number | Name | Date |
| --- | --- | --- |
| 2,002,944 | Hathorn | May 28, 1935 |
| 2,353,086 | Schaaff | July 4, 1944 |